United States Patent
Fukazawa et al.

[11] Patent Number: 5,986,421
[45] Date of Patent: Nov. 16, 1999

[54] SAFETY DEVICE FOR POWER WINDOW

[75] Inventors: Fusao Fukazawa; Keiichi Tajima; Tsutomu Takiguchi, all of Shizuoka, Japan

[73] Assignee: Koito Manufacturing Co., Ltd., Tokyo, Japan

[21] Appl. No.: 09/134,034

[22] Filed: Aug. 14, 1998

[30] Foreign Application Priority Data

Aug. 14, 1997 [JP] Japan .................................. 9-219395

[51] Int. Cl.[6] .................................................. G05B 5/00
[52] U.S. Cl. ........................ 318/466; 318/468; 318/470; 318/282; 318/286
[58] Field of Search .................................... 318/466, 468, 318/470, 280, 282, 286, 763; 338/68, 72, 73, 74

[56] References Cited

U.S. PATENT DOCUMENTS

| 3,579,169 | 5/1971 | Dickinson ................................ 338/170 |
| 4,349,822 | 9/1982 | Decalonne ............................... 340/870 |
| 5,351,439 | 10/1994 | Takeda et al. ............................. 49/28 |
| 5,399,981 | 3/1995 | Vermesse ................................ 324/714 |
| 5,404,673 | 4/1995 | Takeda et al. ............................. 49/28 |
| 5,422,521 | 6/1995 | Takeda et al. ............................ 318/265 |
| 5,459,379 | 10/1995 | Takeda et al. ............................ 318/469 |

FOREIGN PATENT DOCUMENTS

| 2 267 161 | 11/1993 | United Kingdom ............ E05F 15/16 |
| 2 268 287 | 1/1994 | United Kingdom ............ E05F 15/16 |
| 2 228 036 | 10/1995 | United Kingdom ............ E05F 15/16 |
| WO 92/10822 | 6/1992 | WIPO ............................ G08C 19/02 |

*Primary Examiner*—Robert E. Nappi
*Assistant Examiner*—Rita Leykin
*Attorney, Agent, or Firm*—Sughrue, Mion, Zinn, Macpeak & Seas, PLLC

[57] ABSTRACT

A safety device for a power window in which window glass of a vehicle is made to undergo an opening or closing operation by a driving motor, and which effects safety control against the nipping of a foreign object by detecting the opening and closing positions of the window glass, comprises: a position sensor for detecting the position of an angle of rotation of the driving motor; a detector the opening or closing position of the window glass based on an output of the position sensor; and a controller for effecting safety control against the nipping of the foreign object based on the detector.

4 Claims, 10 Drawing Sheets

ANGLE OF ROTATION (DEGREE)
OF ROTARY DISK (OUTPUT SHAFT)

SAFETY DEVICE FOR POWER WINDOW

BACKGROUND OF INVENTION

The present invention relates to a power window which is used in a vehicle such as an automobile to effect the operation of opening and closing a window by a driving source such as a motor, and more particularly to a safety device which performs a safety controlling operation by detecting a state in which a passenger's hand, head, or the like is nipped between window glass and a sash.

In a power window, since the window glass is generally made to undergo opening and closing operations by a motor or the like, an accident can occur in which a passenger's hand, head, or the like is nipped between the window glass and the sash. For this reason, safety devices have been conventionally proposed for preventing an accident by detecting the state of a foreign object being nipped between the window glass and the sash, and by such as stopping the operation of opening or closing the window glass or effecting the operation of opening the window glass at that time. As such window safety devices proposed by the present applicant, various devices have been proposed including Unexamined Japanese Patent Application Publication No. Hei. 5-321530. As a safety device of this type, the motor for driving the window glass is furnished with a pulse signal oscillator comprising a Hall element, and a safety control region is determined by detecting the absolute velocity and relative velocity of the closing operation of the window glass by a detecting means on the basis of this pulse signal and by detecting the opening or closing direction by the detecting means. During the closing operation, the nipping of a foreign object is detected from at least one detection result of the absolute velocity and the relative velocity. Then, when the nipping of the foreign object is detected, safety control is effected for forcibly operating the window glass in the opening direction so as to release the foreign object from nipping by the window glass and the sash.

According to such a safety-control-region determining technique, however, since an error occurs in the determination of the safety control region due to the miscounting of the pulse signal and the like, a window-glass-position detecting mechanism such as a limit switch is newly required in the vicinity of the upper limit of the window glass. Further, as proposed in, for example, Unexamined Japanese Patent Application Publication No. Hei. 8-303113, this window-glass-position detecting mechanism requires an automatic position adjusting mechanism to omit the mounting-position adjusting operation in the assembling process in an automobile plant, so that the structure becomes complex, constituting a cause for leading to higher cost.

Accordingly, it is conceivable to determine positions for opening and closing the window by a position sensor and detect the state of the opening and closing operation of the window by means of an output from the position sensor. In this case, as the position sensor, if, for example, a potentiosensor is arranged along a rail along which the window is made to undergo the opening and closing operations, since the resistance value of the potentiosensor varies depending on the opening and closing positions of the window, it is possible to detect the opening and closing positions of the window. This arrangement, however, requires a potentiosensor of a length extending over the entire stroke of the opening and closing operation of the window, so that the structure of the vehicle window becomes complex, and it is difficult to overcome the aforementioned higher cost.

SUMMARY OF INVENTION

The object of the present invention is to provide a safety device for a power window which detects the nipping of a foreign object by the window by detecting the entire stroke of the opening and closing operation of the window by means of a position sensor so as to enable a safety measure against the nipping, and which makes it possible to make the position sensor compact and realizes the simplification of a circuit required for the device.

In accordance with the present invention, there is provided a safety device for a power window in which window glass of a vehicle is made to undergo an opening or closing operation by a driving motor, and which effects safety control against the nipping of a foreign object by detecting the opening and closing positions of the window glass, comprising: a position sensor for detecting the position of an angle of rotation of the driving motor; means for detecting the opening or closing position of the window glass on the basis of an output of the position sensor; and means for effecting safety control against the nipping of the foreign object on the basis of the position detecting means. Here, the position sensor includes a resistance track formed by an electric resistor pattern formed in a arcuate shape and an electrically conductive brush which is made to undergo a rotating operation while being slid on the resistance track, the position sensor is formed as a potentiosensor which outputs an output signal in which its resistance value is changed when the driving motor is driven. Furthermore, in this case, the electrically conductive brush is formed by two electrically conductive brushes provided at different positions in a rotating direction, and output signals with different phases are respectively outputted from the electrically conductive brushes in correspondence with the rotative driving of the driving motor.

BRIEF DESCRIPTION OF THE DRAWINGS

FIG. 4(a) is a plan view of a resistance track disk, and FIG. 4(b) is a fragmentary side elevational view of the power-window driving unit;

DETAILED DESCRIPTION OF PREFERRED EMBODIMENTS

Figure 1:
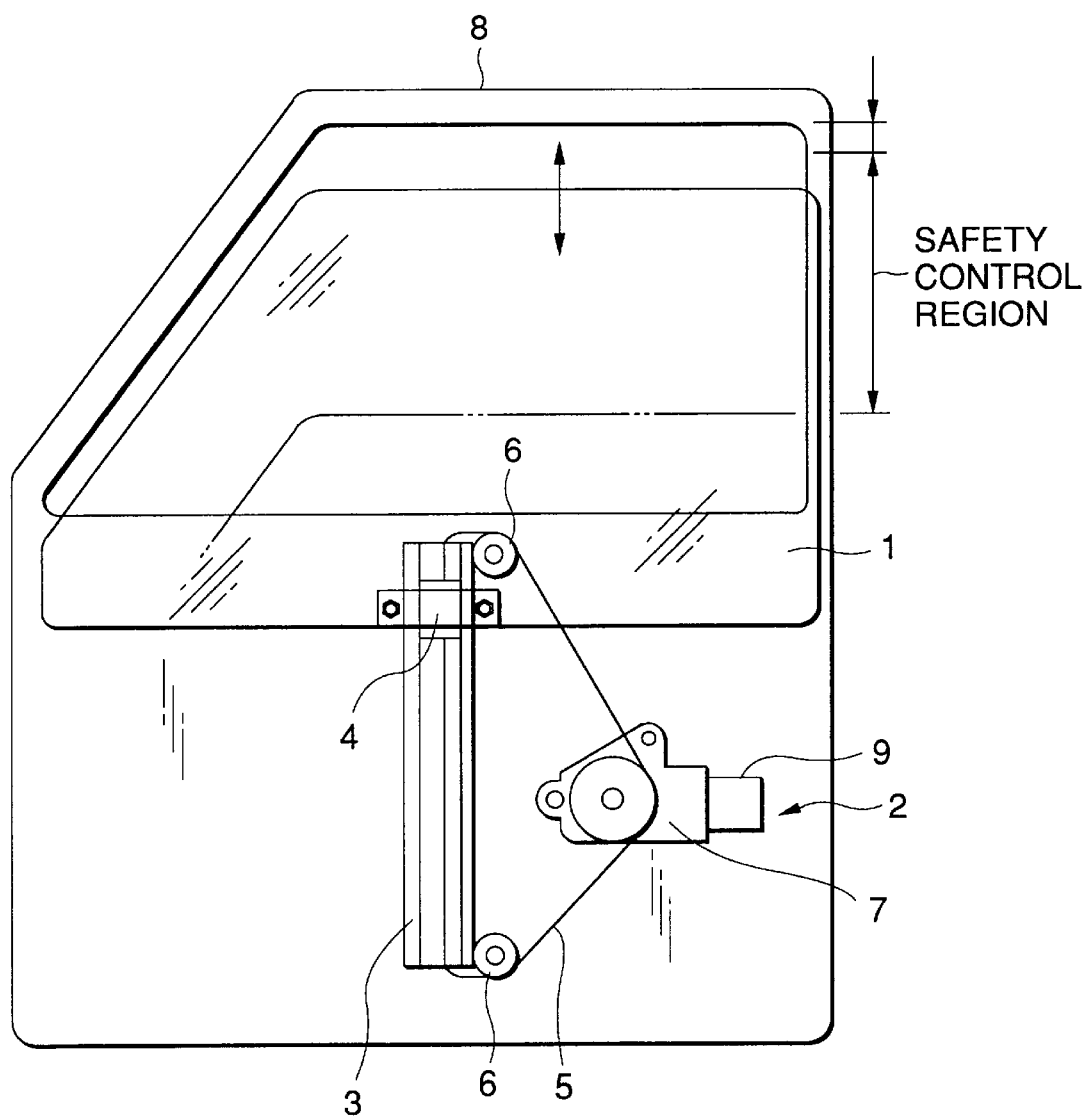
FIG. 1 is a schematic structural diagram of a window opening and closing mechanism of a power window to which the present invention is applied.

Next, referring to the drawings, a description will be given of an embodiment of the present invention. FIG. 1 is a schematic structural diagram of a power window apparatus to which the present invention is applied, wherein window glass 1 is opened or closed by an opening and closing mechanism 2 provided in a vehicle body on the lower side of an automobile window. Namely, a rail 3 extends in the vertical direction of the vehicle body, and a slider 4 is held therein in such a manner as to be vertically slidable. A wire 5 is connected to the slider 4, and the wire 5 is wound around a pulley 6 and is connected to a power-window driving unit 7. When the power-window driving unit 7 is driven, the slider 4 is moved vertically by means of the wire 5. The window glass 1 is attached to the slider 4, and when the window glass 1 is moved vertically together with the slider 4, a window space defined by a sash 8 is opened or closed. The aforementioned power-window driving unit 7 has a motor 9 serving as a driving source, and the wire 5 is rotated by the rotating force of this motor so as to move the window glass 1 vertically. For example, when the motor is rotated in the forward direction, the window glass is moved upward to close the window, and when it is rotated in the opposite direction, the window glass is moved downward to open the window.

Figure 2:
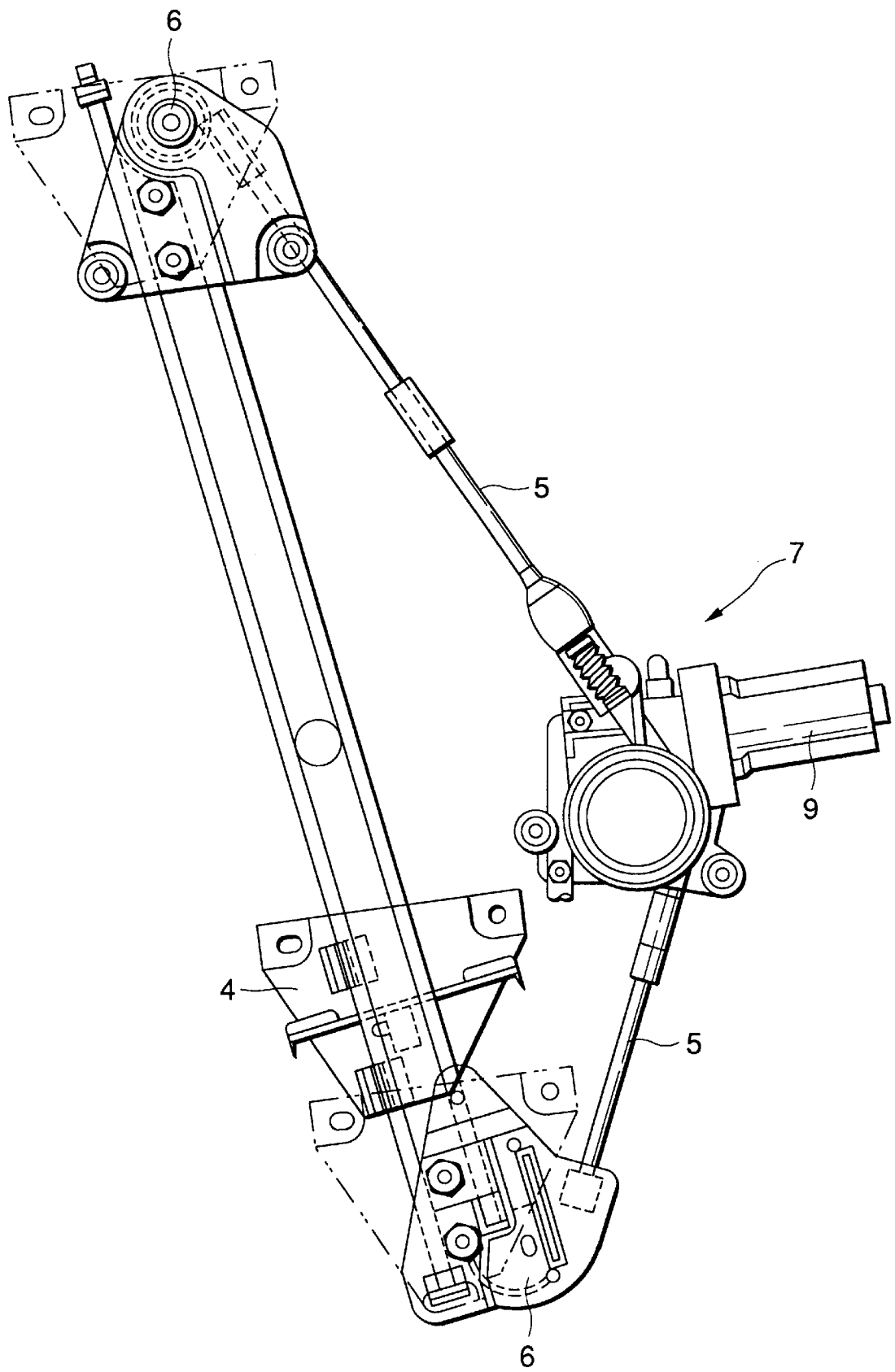
FIG. 2 is a front elevational view of essential portions of the window opening and closing mechanism.
Figure 3:
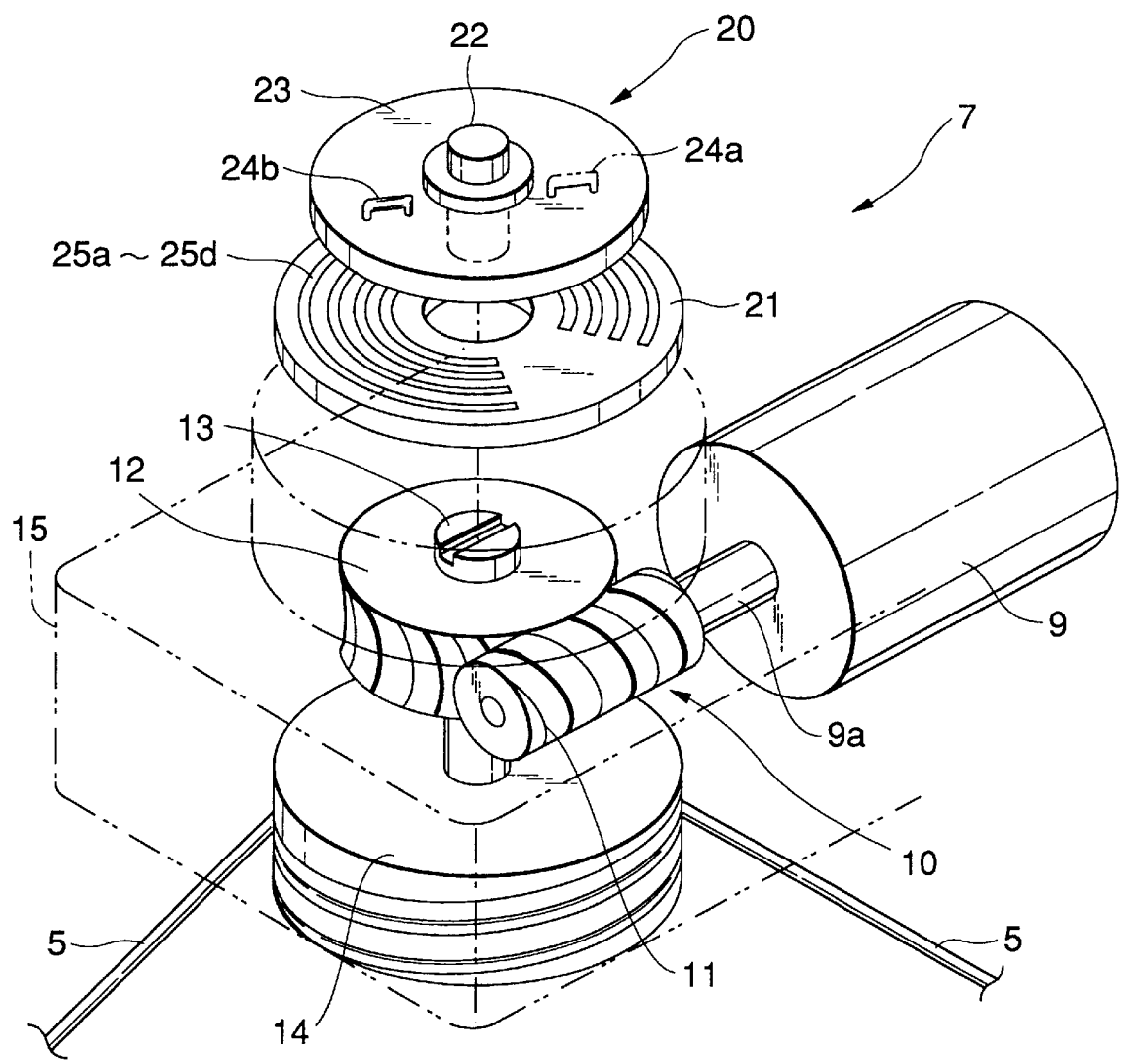
FIG. 3 is an exploded perspective view of essential portions of a power-window driving unit.

FIG. 2 is a front elevational view of one example of the above-described power window apparatus, and portions corresponding to the respective parts in FIG. 1 are denoted by the same reference numerals. As the structure of its essential portions is shown in an exploded view in FIG. 3, the power-window driving unit 7 comprises, the motor 9 which is rotatively driven by electric power; a speed reducing mechanism 10 for decelerating the rotational output of the motor to drive the wire 5; and a potentiosensor 20 for detecting the position of the angle of rotation of an output shaft of this speed reducing mechanism 10. A worn 11 is fixed to one end portion of a rotating shaft 9a of the motor 9, and a worm wheel 12 meshes with the worm 11, thereby constituting the speed reducing mechanism 10. Further, a pulley 14 around which the wire 5 is wound is fixed to one end portion of an output shaft 13 which is rotated integrally with the worm wheel 12. Incidentally, this pulley 14 is accommodated in a case 15 which is formed integrally with the motor 9. Accordingly, when the motor 9 is driven to rotate the pulley 14 via the speed reducing mechanism 10, the wire 5 is driven to move the window glass 1 in the opening or closing direction. In this embodiment, the arrangement provided is such that when the pulley 14 undergoes three to four revolutions, the window glass 1 moves the entire stroke for the opening or closing operation.

Figure 4A:
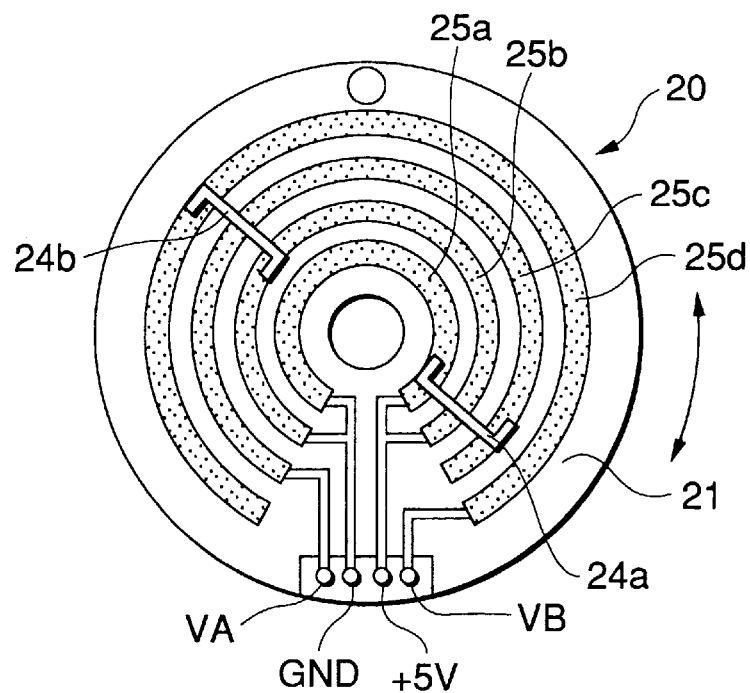
FIGS. 4(a) and 4(b) are diagrams illustrating a potentiosensor, more specifically.
Figure 4B:
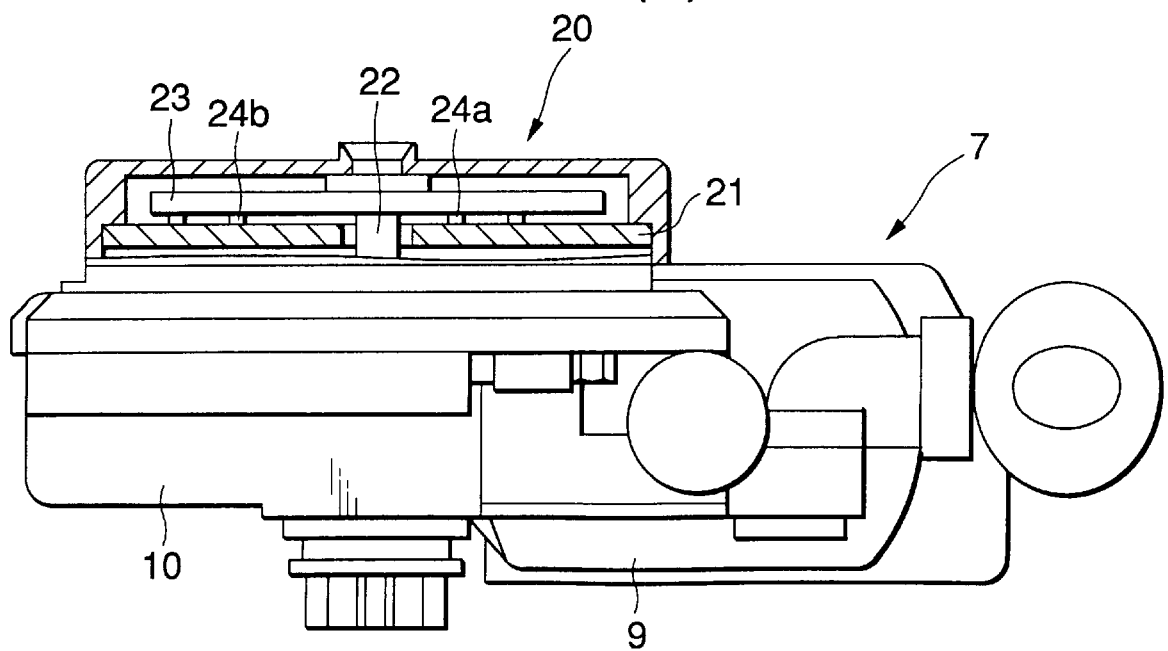

In addition, as shown in FIG. 4, the potentiosensor 20 is disposed inside the case 15 on a side opposite to the pulley 14. The potentiosensor 20 is provided with the following parts which are integrally formed: a circular resistance track disk 21 disposed at a position coaxial with the output shaft 13 of the worn wheel 12 and is fixedly supported; a potentiosensor shaft 22 which is passed through a central hole in this resistance track disk 21 and is integrally coupled with the output shaft 13 in the rotating direction; and a rotary disk 23 having a pair of conductive brushes 24a and 24b, which are arranged in face-to-face relation on the resistance track disk 21 and are slid in the rotating direction on a pattern surface of each potentio track. A plurality of arcuate potentio tracks 25a to 25d are formed on a surface of the resistance track disk 21 on the side opposing the rotary disk 23.

FIG. 4(a) is a pattern diagram of the potentio tracks 25a to 25d provided on the resistance track disk 21. These tracks are formed on the surface of the resistance track disk made of an insulating material, by being arranged concentrically with the potentiosensor shaft 22 as the four potentio tracks 25a to 25d whose central angle is set at 270 degrees. Of these tracks, the inner two tracks 25a and 25b are formed of a material such as carbon as resistance tracks, and the outer two tracks 25c and 25d are formed of a good conductive material such as copper as conductive tracks. It should be noted that, of these tracks, the tracks 25a and 25b can be formed as a single track. The resistance tracks 25a and 25b are provided with terminal portions at their opposite ends, and a power supply VCC and GND are connected to the resistance tracks through these terminal portions. Further, an arrangement is provided such that output voltages VA and VB, which will be described later, are fetched from the terminal portions of the conductive tracks 25c and 25d. The rotary disk 23 is formed into a circular disk with the potentiosensor shaft 22 as its center, and the aforementioned conductive brushes 24a and 24b are fixedly supported at two diametrically opposing locations thereon. These conductive brushes 24a and 24b are arranged to come into contact with the resistance tracks 25a, 25c and 25b, 25d provided on the resistance track disk 21, respectively.

Figure 5A:
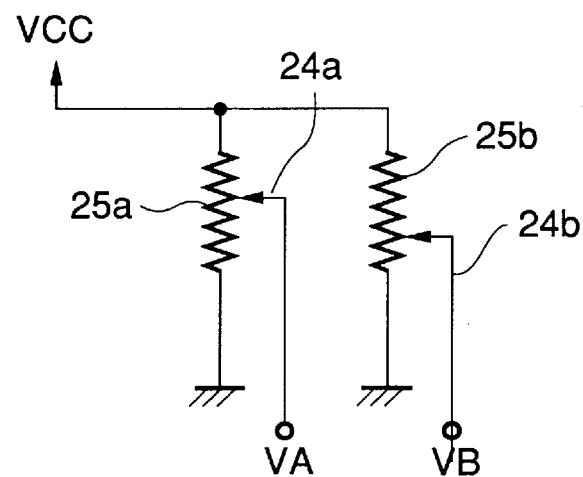
FIGS. 5(a) and 5(b) are diagrams illustrating an equivalent circuit of the potentiosensor and its output characteristic.
Figure 5B:
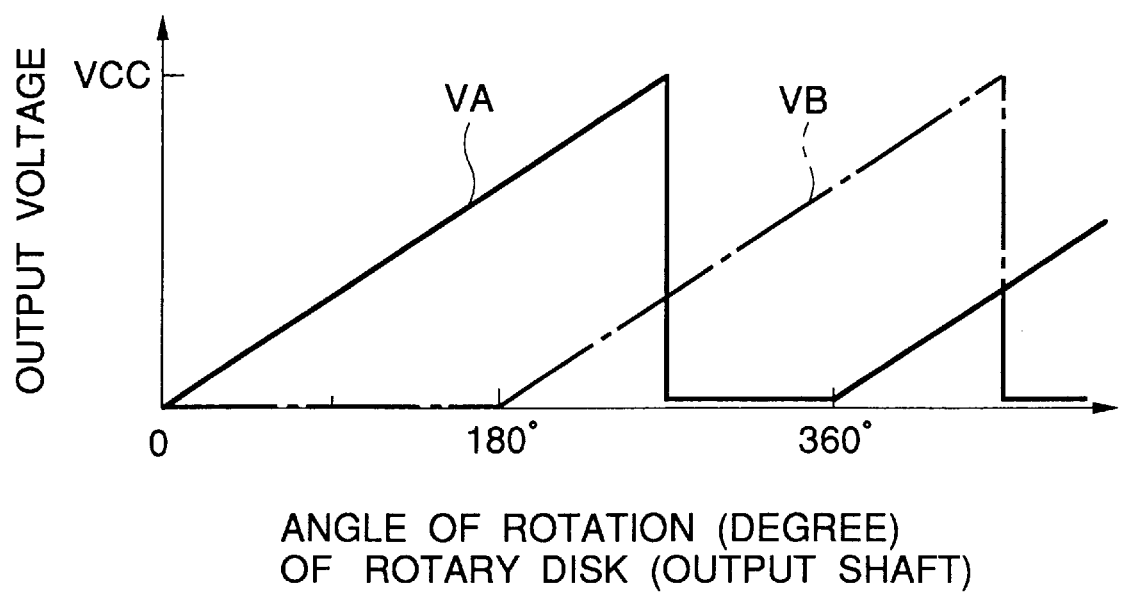

Accordingly, when the driving motor 9 is driven, and its rotatively driving force is transmitted from the worm 11 of the rotating shaft 9a to the worm wheel 12 to rotate the output shaft 13, the wire 5 is driven by the pulley 14 to cause the window glass 1 to undergo an opening or closing operation, while the rotary disk 23 is concurrently rotated, and the amount of its rotation is detected by the potentiosensor 20. That is, when the rotary disk 23 is rotated, the conductive brushes 24a and 24b are rotated along the surface of the resistance track disk 21. For this reason, as for the two conductive brushes 24a and 24b, which at their one ends are held in contact with the resistance tracks 25a and 25b, their positions of contact with the resistance tracks 25a and 25b change in the rotating direction, in conjunction of which the output voltages VA and VB, which are obtained by dividing the supply voltage VCC outputted to the ends of the conductive tracks 25c and 25d, change. At this time, since the two conductive brushes 24a and 24b are arranged at positions opposing each other 180 degrees, the phases of their outputs are offset 180 degrees ($\pi$) with respect to the angle of rotation of the rotary disk. FIG. 5(a) is an equivalent circuit diagram of the potentiosensor 20, and FIG. 5(b) is a diagram illustrating its output characteristic. The abscissa in FIG. 5(b) denotes the angle of rotation of the rotary disk, while the ordinate denotes voltage values of the output voltages VA and VB outputted from the potentiosensor 20. As can be seen from the drawing, the output voltage VA of one conductive brush 24a shown by the solid line and the output voltage VB of the other conductive brush 24b shown by the chain line are phase offset from each other by 180 degrees. Incidentally, in the 90-degree angular region where the resistance tracks are not formed, the outputs are set in a cut-off state, as shown in the drawing.

Figure 6:
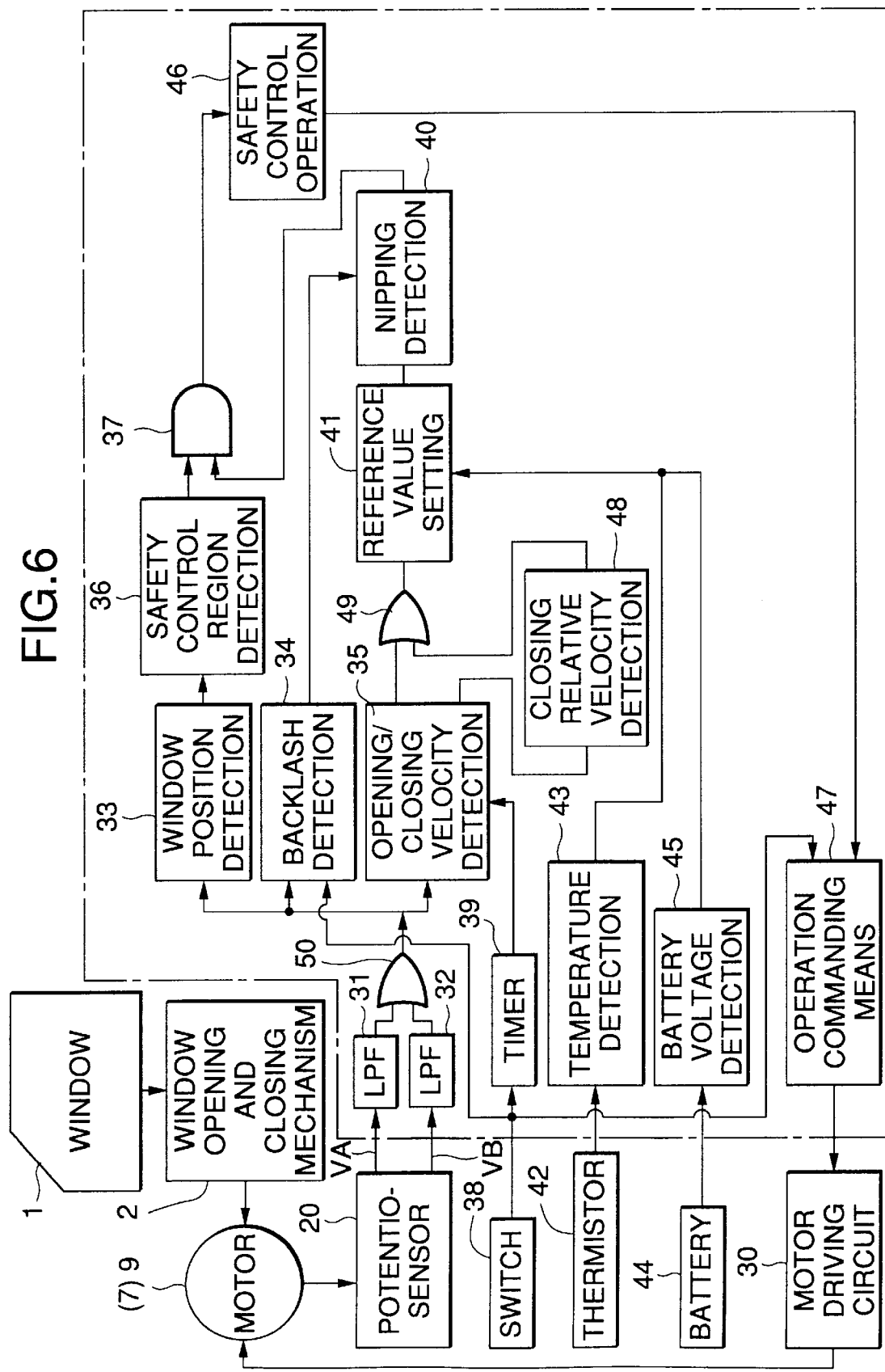
FIG. 6 is a block diagram illustrating the overall configuration of a safety device in accordance with the present invention.

FIG. 6 is a block circuit diagram illustrating the overall configuration of the safety device of the present invention which uses the above-described position sensor, i.e., the potentiosensor. In the power-window driving unit 7, the forward and backward rotative driving is effected by a motor driving circuit 30. As the driving motor 9 is rotated, the window is caused to undergo opening or closing operations, and the positions of the angle of rotation of this driving motor 9 are outputted from the potentiosensor 20 as the two output voltages VA and VB, as described above. After their noise is eliminated by low-pass filters (LPFs) 31 and 32, respectively, these output voltages VA and VB are respectively inputted to a window-position detecting unit 33, a backlash detecting unit 34, and a closing-velocity detecting unit 35 via an OR gate 50.

The window-position detecting unit 33 detects the position for opening or closing the window, and outputs the opening or closing position to a safety-control-region detecting unit 36. This safety-control-region detecting unit 36 detects a safety control region of the window from the inputted opening or closing position. This safety control region is a region from a state in which the window is fully opened to a state immediately preceding the full closing thereof, and safety control against nipping is performed in this region only. That is, the state immediately preceding the full closing of the window is a state similar to the state in which the window glass 1 is brought into contact with the sash 8 and a foreign object is nipped by its contact resistance, so that a nipping detecting unit, which will be described later, consequently detects this state as a nipped state. The safety control in this safety control region is effected to prevent the window from not being fully closed at that time.

Meanwhile, the backlash detecting unit 34 detects the backlash in the closing operation after the opening/operation of the window glass on the basis of a change in the output voltage from the potentiosensor 20 accompanying the backlash occurring when a window opening/closing switch 38 of the power window is turned on and the window is operated in the opposite direction. In addition, the closing-velocity detecting unit 35 detects the velocity in the closing operation of the window glass. To detect this velocity, in the closing-velocity detecting unit 35, a fixed time duration from the time the window opening/closing switch 38 is turned on is detected by a timer 39, a calculation is made by using a change in voltage from the potentiosensor 20 during this fixed time duration, the absolute velocity in the closing operation of the window glass is detected, while the relative velocity, i.e., the velocity of its change, is detected by a relative-velocity detecting unit 48, and the absolute velocity and the relative velocity are outputted to a reference-value setting means 41. A nipping detecting unit 40 detects the nipping of a foreign object by the window glass by making use of detected outputs from backlash detecting unit 34 and the closing-velocity detecting unit 35. In the detection of the nipping of a foreign object, when backlash has not occurred, the absolute velocity or relative velocity in the closing operation of the window is compared with a reference absolute velocity or a reference relative velocity of the reference-value setting unit 41, and when this closing velocity has become slower than the respective reference velocity, it is detected that the state is one in which a foreign object is nipped. The nipping detection output is inputted to the other input terminal of an AND gate 37. It should be noted that although the aforementioned reference velocities are set in advance, the reference velocities are corrected by referring to outputs of a temperature detecting unit 43 using a thermistor 42 as well as a battery-voltage detecting unit 45 for detecting the voltage of a battery 44 so that the reference velocities will not change by a temperature change and a change in the battery voltage.

When the window is in the safety control region and the nipping is detected, the AND gate 37 outputs a safety-control operation signal. Upon receiving this safety-control operation signal, a safety-control operation unit 46 outputs an operation command to an operation commanding unit 47, which in turn reversely rotates the driving motor 9 by a predetermined amount, i.e., rotatively drives the driving motor 9 in the opening direction by a predetermined amount, by controlling the motor driving circuit 30. As a result, when a person's hand or fingers have been nipped between the window glass 1 and the sash 8, the window is immediately made to undergo an opening operation, and the nipping is released, thereby effecting safety control of the power window.

Figure 7:
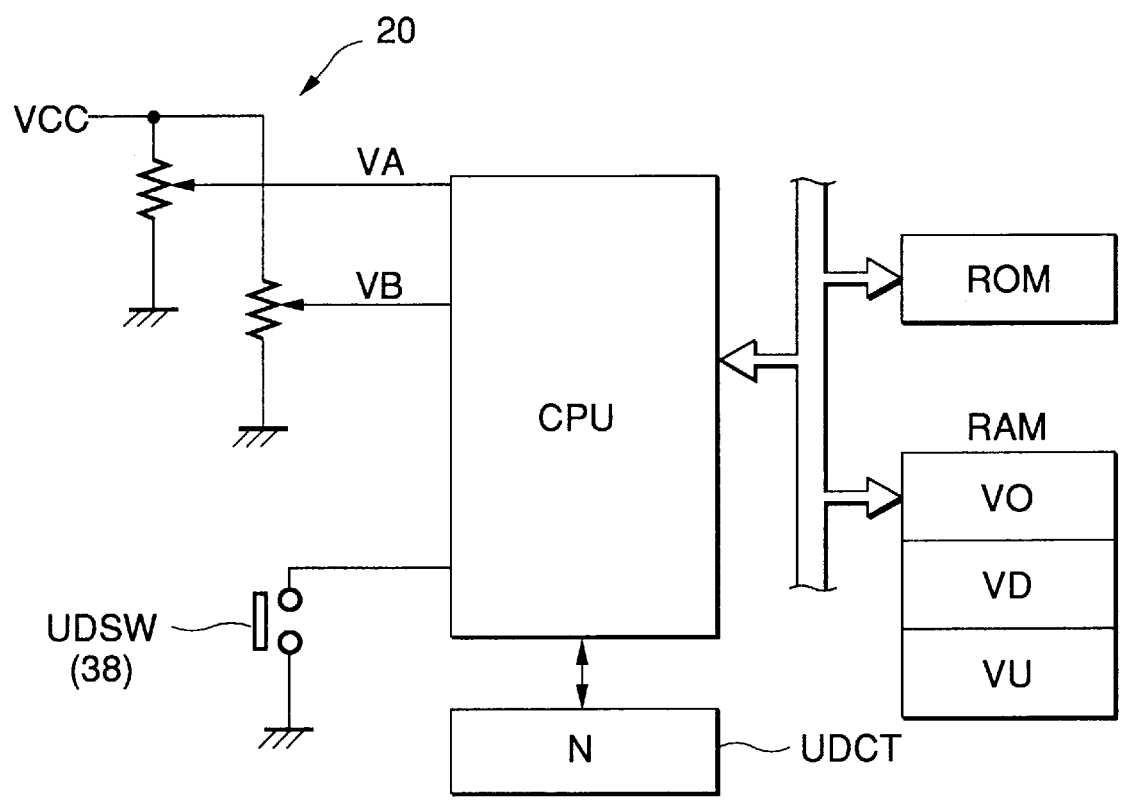
FIG. 7 is a block diagram illustrating the configuration of a window-position detecting unit.

FIG. 7 is a block diagram illustrating the configuration of the window-position detecting unit 33. The window-position detecting unit 33 comprises, a CPU to which are inputted the output voltages VA and VB from the potentiosensor 20 and a signal representing the state of an up-down switch UDSW (38) for changing over the closing direction (up) or the opening direction (down) of the window; a ROM storing an operating program of the CPU; a RAM for storing the various set voltages determined from the voltages VA and VB; and an up-down counter UDCT used for selecting between the output voltages VA and VB.

Figure 8:
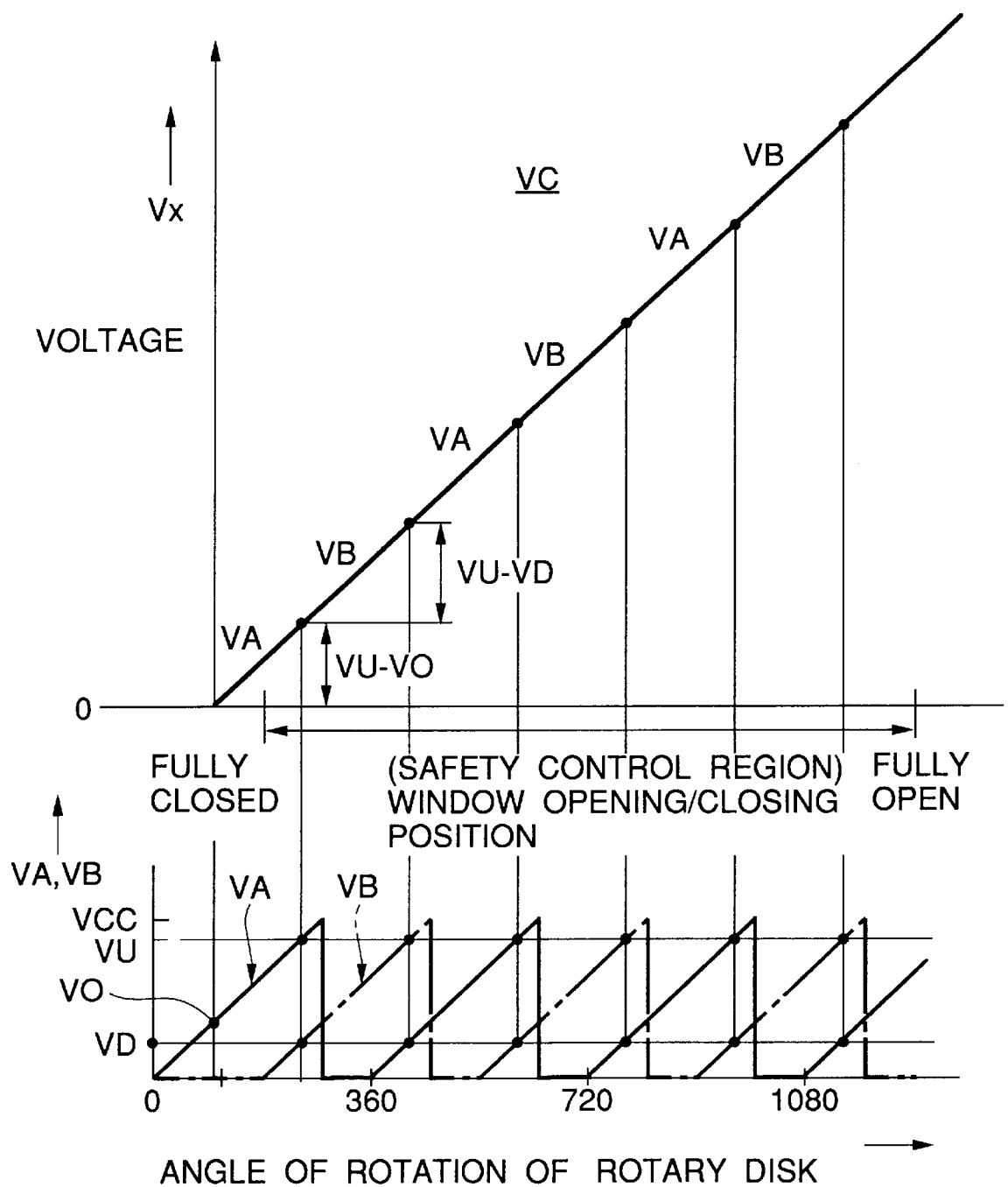
FIG. 8 is a diagram illustrating the relationship between the voltage and the opening and closing positions for explaining the method of detection by the window-position detecting unit.

FIG. 8 is a diagram illustrating the output characteristic of the potentiosensor 20 which follows the window which is made to undergo opening and closing operations by being driven by the power-window driving unit 7. The abscissa denotes the moving distance of the window glass, and the fully closed state of the window changes to the fully opened state in the rightward direction in the drawing. Meanwhile, the ordinate denotes the output voltage of the potentiosensor 20, and VA denotes an output voltage of one conductive brush on the rotary disk of the potentiosensor, while VB similarly denotes an output voltage of the other conductive brush. The window-position detecting unit calculates a virtual position voltage having the characteristic shown at VC in the drawing on the basis of these outputs A and B, and detects the opening or closing position of the window on the basis of this calculated position voltage VC.

Figure 9:
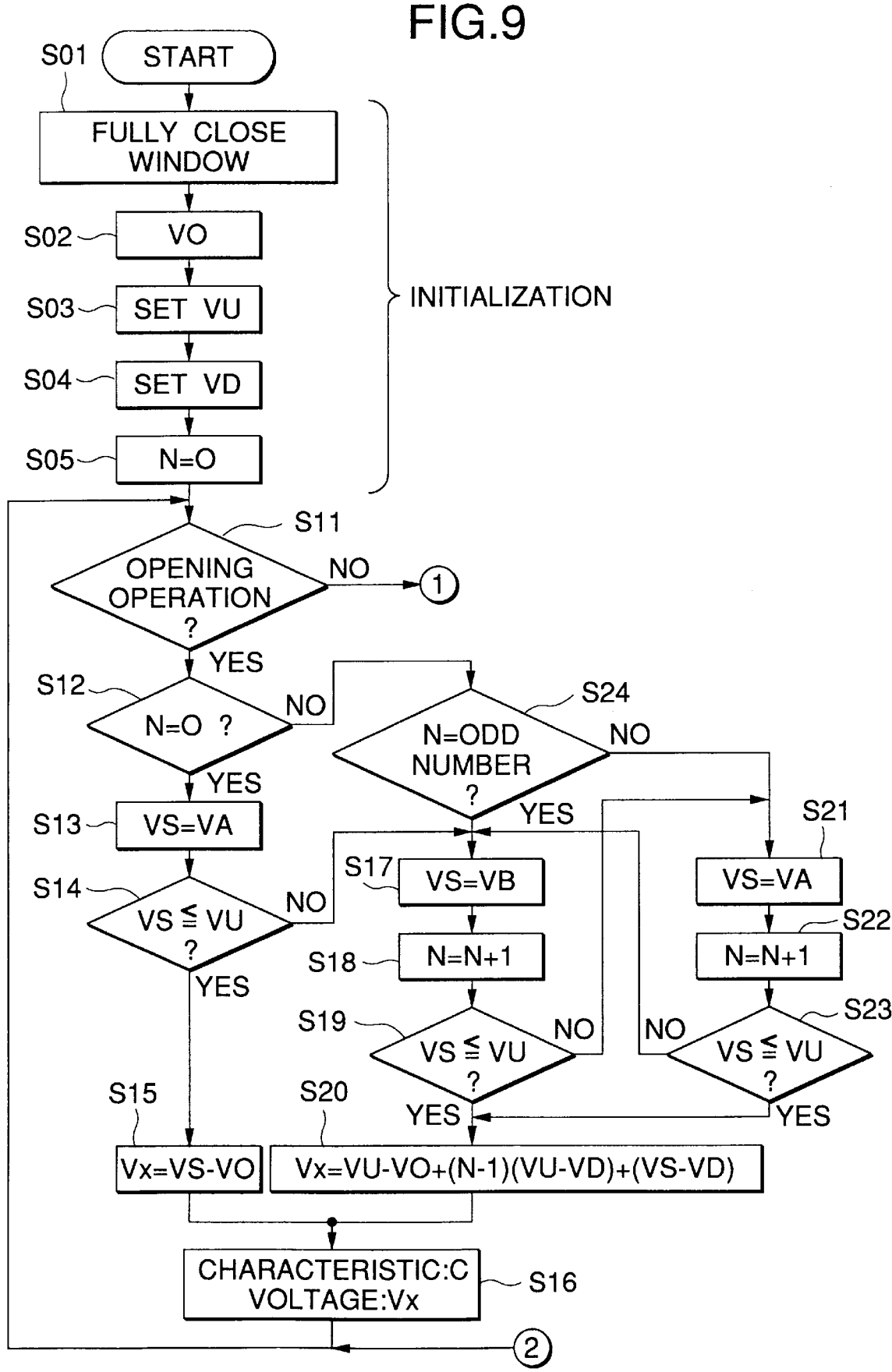
FIG. 9 is part 1 of a flowchart for explaining the window-position detecting operation.

FIG. 9 is a flowchart illustrating the position detecting operation by the window-position detecting unit 33. First, initialization is effected in a manufacturing plant where the power window apparatus of the present invention is installed in an automobile. In this initialization, the window glass 1 is moved upward and is set in the fully closed state (S01), and one output voltage from the potentiosensor 20 when the window glass is locked is detected. In the case of this embodiment, the output voltage VA from the potentiosensor 20 is detected, and that voltage is stored in the RAM as a fully closed voltage V0 (S02). In addition, the maximum voltage VCC of each of the output voltages VA and VB from the potentiosensor 20 is detected, and a voltage which is lower than this maximum voltage VCC by a predetermined voltage, i.e., in this embodiment, 4.5 V which is 0.5 V lower than the maximum voltage of 5 V, is stored in the RAM as a detected maximum voltage VU (S03). Further, the voltage of the other output voltage VB or VA when one output voltage VA or VB is this detected maximum voltage VU is stored in the RAM as a detected minimum voltage VD (S04). Subsequently, the count N is set to N–0 by the up-down counter (S05). Incidentally, even after the manufacture of the automobile, this initialization can be effected, as necessary, by the resetting operation.

Thus, to detect the position of the window in the power window apparatus for which initialization has been effected, the output voltages VA and VB are first detected from the potentiosensor, and on the basis of the opening/closing information signal from the window opening/closing switch UDSW, detection is made as to whether the window is to undergo the closing operation or the opening operation (S11). Then, in the case of the opening operation, the value N of the up-down counter is determined (S12), and if N=0, the output voltage VA is set to VS (S13), and this voltage VS is compared with the detected maximum voltage VU (S14).

If the voltage VS is less than or equal to VU, from this voltage VS and the aforementioned fully closed voltage V0, $$Vx = VS - V0 \quad (1)$$

is determined (S15), and the window position is detected by corresponding this Vx to the output characteristic VC in FIG. 8 (S16). Namely, the window position on the abscissa is detected from the voltage Vx on the ordinate representing the output characteristic in FIG. 8.

In addition, in Step S14, when the VS is a higher voltage than VU, the voltage VB is adopted and is set as VS (S17). Further, the value N of the up-down counter is set as N=N+1 (S18), the voltage VS is compared with the detected maximum voltage VU (S19), and if VS is less than or equal to VU, Vx is determined from the voltage VS, the fully closed voltage V0, the detected minimum voltage VD, and the detected maximum voltage VU as follows (S20):

$$Vx = VU - V0 + (N-1)(VU - VD) + (VS - VD) \quad (2)$$

On the basis of this Vx, the window position is detected from the output characteristic C in FIG. 8 (S16). In addition, if VS is a higher voltage than VU in Step S19, the voltage VA is adopted and is set as VS (S21), the value N of the up-down counter is set as N=N+1 (S22), the voltage VS is compared with the detected maximum voltage VU (S23), and if VS is less than or equal to VU, the operation proceeds to the aforementioned Step S20 in which Vx is determined in the same way as described above (S20).

Further, if the value N of the up-down counter is other than 0 in Step S12, a determination is made as to whether or not N is an odd number (S24). If N is an odd number, the operation proceeds to the aforementioned Step S17 in which the voltage VB is adopted and is set as VS. On the other hand, if N is an even number, the operation proceeds to the aforementioned Step S21 in which the voltage VA is adopted and is set as VS. Thereafter, the above-described steps are executed, and as a result, in Step S20, the window position is detected on the basis of Vx determined from the aforementioned Formula (2).

Figure 10:
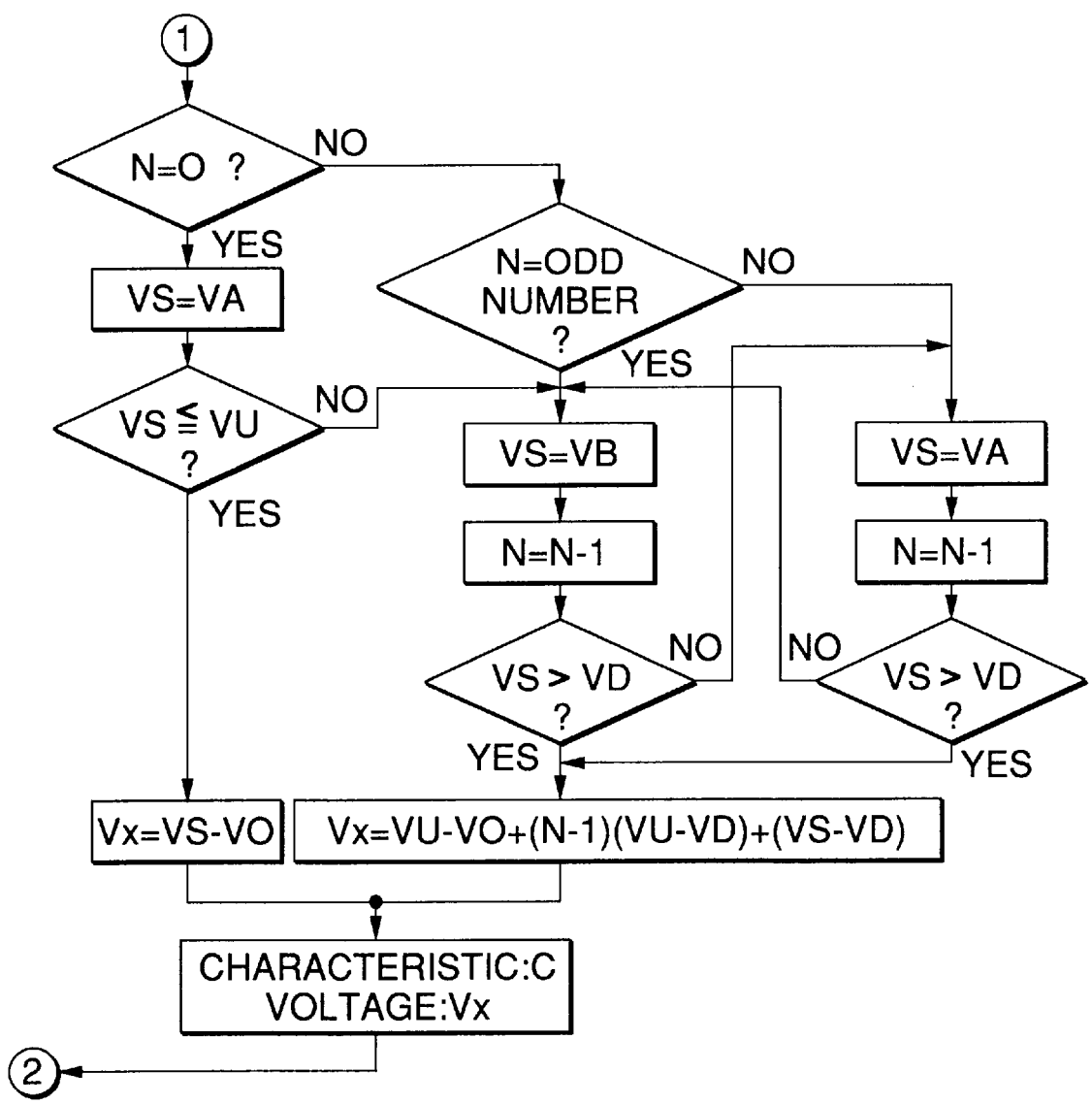
FIG. 10 is part 2 of the flowchart for explaining the window-position detecting operation.

In addition, in Step S11, the processing in the case of the closing operation of the power window apparatus is basically the same as the processing of the above-described opening operation, and it suffices if the decision "VS≦VU?" in steps S14, S19, and S23 is substituted by "VS>VD?" and "N=N+1" concerning the value N of the counter in Steps S18 and S22 is substituted by "N=N−1." The flowchart is shown in FIG. 10, and a detailed description thereof will be omitted.

Incidentally, it goes without saying that the position detecting operation in the window-position detecting unit can be programmed into various configurations. Nevertheless, since the entire stroke from the full closing to the full opening of the window can be detected by making use of the potentiosensor provided in the power-window driving unit, a compact arrangement and a simplified circuit can be realized as compared with the arrangement in which the potentiosensor is arrangement over the entire length of the guide rail.

As described above, in accordance with the present invention, to effect safety control against the nipping of a foreign object by the window glass, as a sensor for detecting the opening and closing positions of the window, there is provided a position sensor for detecting the position of the angle of rotation of the driving motor for effecting the opening and closing operation of the window glass. Therefore, since the entire stroke from the full closing to the full opening of the window can be detected by only the signal from the driving motor, it is unnecessary to arrange the position sensor over the entire length of the guide rail as in the conventional manner, so that a compact arrangement and a simplified circuit can be realized as compared with the conventional arrangement, and a suitable installation in the automobile can be realized.

What is claimed is:

1. A safety device for a power window in which window glass of a vehicle is made to undergo an opening or closing operation by a driving motor, and which effects safety control against the nipping of a foreign object by detecting the opening and closing positions of the window glass, comprising:

a position sensor for detecting the position of an angle of rotation of the driving motor;

means for detecting the opening or closing position of the window glass based on an output of said position sensor; and means for effecting safety control against the nipping of the foreign object based on said position detecting means, wherein said position sensor includes a resistance track formed by an electric resistor pattern formed in an arcuate shape and an electrically conductive brush which is made to undergo a rotating operation while being slid on said resistance track, said position sensor is formed as a potentiosensor which outputs an output signal in which its resistance value is changed when said driving motor is driven, and wherein said electrically conductive brush is formed by two electrically conductive brushes provided at different positions in a rotating direction, and output signals with different phases are respectively outputted from said electrically conductive brushes in correspondence with the rotative driving of said driving motor.

2. The safety device for a power window according to claim 1, wherein a central angle of said arcuate shape of said resistance truck is set at 270 degrees, and said two conductive brushes are arranged at positions opposing each other 180 degrees.

3. The safety device for a power window according to claim 2, wherein said position detecting means includes a up-down counter used for selecting between the output signals from said electrically conductive brushes.

4. The safety device for a power window according to claim 1, wherein said safety control effecting means includes means for opening the window in a predetermined amount when said detecting means detects the nipping of the foreign object.

* * * * *